UNITED STATES PATENT OFFICE.

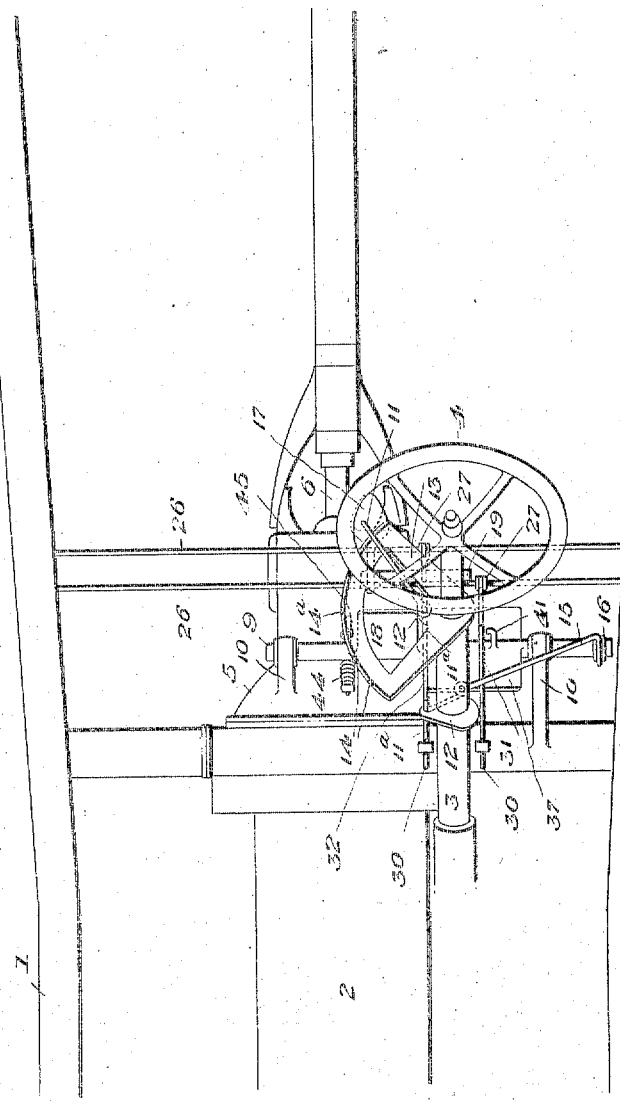

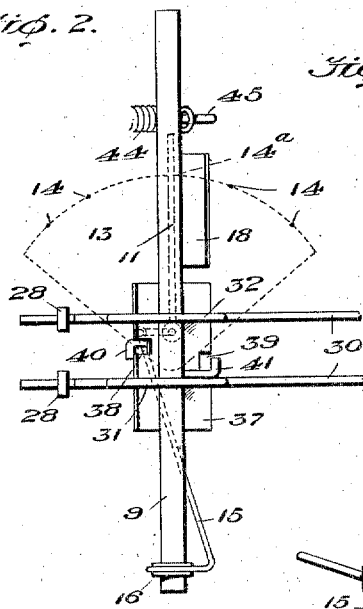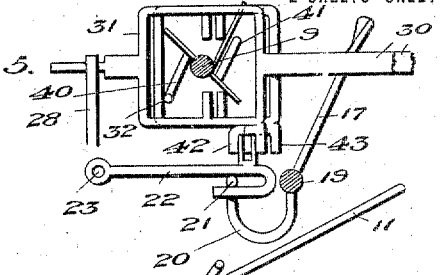

FREDERICK E. RENICK, OF MAMMOTH SPRINGS, ARKANSAS.

AUTOMATIC GEAR-SHIFTING MECHANISM.

1,255,933.  Specification of Letters Patent.  Patented Feb. 12, 1918.

Application filed June 24, 1916. Serial No. 105,572.

*To all whom it may concern:*

Be it known that I, FREDERICK E. RENICK, a citizen of the United States, residing at Mammoth Springs, county of Fulton, and State of Arkansas, have invented certain new and useful Improvements in Automatic Gear-Shifting Mechanism, of which the following is a specification.

This invention relates to automatic gear shifting mechanism.

The invention has for its object the provision of an improved gear shifting mechanism for automobiles which will be of simple construction, relative inexpensiveness of manufacture, positive action and quick and easy control, wherein the shifting actions are subject to a novel and convenient control and are positively actuated by the clutch pedal. The present improvements prevent shifting of the gears until the clutch is entirely released and eliminate any possibility of shifting from low speed to reverse while change is being made from low speed to second speed.

The invention also contemplates the provision of improved means to prevent shifting the gears when the clutch is only partially released and insuring that no shifting occur until the clutch is fully released, this constituting the first action; the second action of the clutch pedal is to throw the parts to neutral position, and only when the clutch pedal is fully shifted will there be effected the desired shifting of the gears. Shifting of the clutch causes positive forcing or shifting of the selected gears as the clutch goes in.

Another object of the invention is to provide improved means whereby should the controlling lever not be set to one of its proper positions, no dangerous or disadvantageous effect would result, but when the clutch pedal is operated, the parts will all be thrown to neutral position.

A further object is to insure against improper or only partial meshing of the change speed gears if the clutch should be only partially operated. This is accomplished by the provision of an improved safety stop means which will prevent the clutch members from engaging until the gears are fully meshed.

To carry out the foregoing objects, and others not specifically mentioned but which will appear from the following description, I provide an improved manually controlled or settable selective means of which one embodiment is hereinafter specifically described and is shown in the accompanying drawings, but I am aware that various modifications could be resorted to without departing from the essential principles of the invention, and I do not limit myself to the precise constructions hereinafter specified, as they are to be considered as illustrative, rather than restrictive, of the scope of the invention.

In the accompanying drawings:

Figure 1 is a plan view showing the invention applied to an automobile, of which only certain parts are shown;

Fig. 2, a detail plan, certain parts being omitted and others in dotted lines;

Fig. 3, a detail elevation, partly in section, showing the selective mechanism when the parts are in neutral position;

Fig. 4, a similar view of the parts when in reverse position;

Fig. 5, a similar view showing the parts arranged for low speed;

Fig. 6, a detail perspective of the selective mechanism; and

Fig. 7, a detail perspective of the gears and shifting shafts, forks, and operating parts.

While the invention is illustrated and described in connection with an automobile, I wish it understood that its use is not thus restricted, as it may be used with other machines. Furthermore, the invention may be applied either to a unit construction in an automobile, amidship construction of the transmission, or where the transmission is mounted on the rear axle, or it can be built as a part of the transmission.

The side frame pieces of the chassis appear at 1, the engine is shown conventionally at 2, steering column at 3, steering wheel at 4, gear casing at 5, and drive shaft at 6.

The invention is shown applied to a type of change speed gear contained within the casing 5 and which are conventionally shown in Fig. 7 at 7 as mounted on the countershaft 8, but may be carried out with any other type of gear arrangement.

The shiftable selective control shaft is shown at 9 which is slidable longitudinally of itself in suitable bearings or guides 10 and may be operated in any preferred manner from means carried by the steering column, or, mounted on the dash or in any other suitable position. A convenient control for the shaft 9 consists of a controlling lever 11 whose shaft 11ª is journaled in bearings 12 and adapted to sweep over a quadrant 13, shown in full lines in Fig. 1 and dotted lines in Fig. 2, there being provided notches 14 to hold the lever 11 in different positions representing, for instance, from left to right in Fig. 1, "reverse;" "first speed;" "neutral;" "second speed;" "third speed." The shaft 11ª has an arm which is connected by a link 15 to a collar 16 on selective shaft 9. According to the position of the lever 11 on the quadrant 13, the selective shaft 9 will be positioned in relation to other devices now to be described so that means carried by said shaft will determine which of the gears 7 will be shifted. The connection between the link 15 and the collar 16 is a rotary or loose one, adapting the shaft 9 to be locked when in any position to which it may be moved by lever 11.

The usual clutch controlling pedal 17 is adapted to contact with a plate 18 carried by shaft 9 in whatever position said shaft may be when said pedal is sufficiently moved. The pedal 17 is carried by a shaft 19 which has an arm 20 whose angular end 21 has a loose connection with a lever 22 pivoted at 23 and carrying a trough-like locking device 24 whose purpose will appear presently.

The gears 7 are shifted by forks 25 carried by rock-shafts 26 which have cranks 27. Slidable in guides 28 at their forward ends and pivoted at 29 at their rearward ends to the cranks 27, are gear shifters 30 which have frames 31 and 32 that are duplicates. Each frame has dogs which on the frame 31, appear at 33 and 34, and on the frame 32 at 35 and 36. The action of the frames 31 and 32 is independent. To determine which of the frames 31, 32 is to be shifted, or, whether said frames are to be moved at all, there is provided a selective member 37 which may assume the form of a baffle plate of sufficient size and rigidity, having notches 38, 39, which are out of transverse alinement, as is clear from Figs. 2 and 6. The width of the baffle plate 37 is such that when the notches 38, 39, are out of register with the frames 31, 32, the actuation of the pedal 17 and its coöperation with the plate 18 will merely dispose the baffle horizontally and block any shifting of the frames 31, 32. This occurs whenever the controlling lever 11 is in the center notch 14ª representing the neutral position, or, when said lever rests on the quadrant 13 in any position intermediate any two of the notches 14 or between a notch 14 and the neutral notch 14ª. Consequently, if the control lever 11 is inadvertently moved to any position other than a proper one, the operation of the clutch pedal 17 will bring about no positive shifting of the gears 7 and the effect will be the same as if the lever were in the neutral position 14ª. This arrangement insures against improper operation of the gears.

The selective baffle plate 37 carries dogs 40, 41, which are adapted to coöperate with either the upper or the lower dogs 33, 34, of frame 31, or the upper or lower dogs 35, 36, of the frame 32 according to the position of the controlling lever 11, and the arrangement of the dogs on the baffle and on said frame is such that only one of the dogs 40, 41, can, at any given time, coöperate with a dog on either of the frames 31 or 32. Consequently, it is impossible to make a wrong combination when shifting the gears 7. When either one or the other of the dogs 40, 41, coöperates with a dog on one of the frames 31, 32, one of the notches 38, 39, is in register with the frame, 31, or, 32, which is being shifted so that a suitable movement of the shifted frame is permitted for otherwise the width of the baffle 37 would prevent shifting of either frame.

The frames 31, 32, carry forks 42, 43, respectively, which either straddle or have one prong fit in, the locking trough 24, according to circumstances. Means are thus provided for locking the gears 7 in any position to which they may be shifted. This device also serves as a safety stop. For instance, if the clutch should not be pushed out far enough, by operating the pedal 17, to throw the gears 7 into complete mesh in any one of the positions possible by the action of the controlling lever 11, one of the points or ends of the forks 42, 43, instead of either straddling the locking trough 24, or entering it, will interfere with one or the other of the upper edges of said trough and prevent completion of the operation of gear shifting so that the clutch will not engage.

In my invention the controlling lever 11, according to its position on the quadrant 13, shifts the shaft 9 longitudinally to the position which will determine the coöperation of one or the other of the dogs 40, 41, with the dogs on the respective frames 31, 32, or, when said lever 11 is in the neutral position 14ª, there will be no such coöperation. Actual coöperation of the dogs is subsequently effected, and the gears 7 are positively shifted, by the operation of the clutch pedal 17. It is the clutch pedal, and not the lever 11, which actually shifts the gears 7.

A spring 44 coöperating with an arm 45, holds the shaft 9 in a given normal position. The arm 45 may rest on the rock-shaft 19. The setting of the lever 11 is, therefore, for the purpose of selectively positioning the baffle 37 and dogs 40, 41, and when the clutch pedal 17 is subsequently operated, the shifting of the gears occurs unless the lever 11 is in the position 14ª.

Having thus described my invention, what I claim as new and desire to secure by Letters Patent, is:—

1. In an automatic gear shifting mechanism, the combination with selective gearshift-determining means, settable to different positions, of gear shifting devices, safety stop locking means adapted to lock the gear shifting devices when they have been properly actuated and to interfere with, or block the action of, said gear shifting devices if they have been improperly actuated, and clutch operating means adapted to coöperate with said gear-shift-determining means to positively operate the gear shifting devices when said clutch operating means is operated.

2. In an automatic gear shifting mechanism, the combination with a gear-shift-determining selector, movable to different positions to determine different gear combinations, of gear shifting devices all of which are coöperatively related to said selector and are movable by the operation of said gear-shift-determining selector, a clutch operating device, and a member carried by the gear-shift determining selector with which said clutch operating device is adapted to coöperate when the gear-shift-determining selector is in any one of the several positions in which it may coöperate with said gear shifting devices.

3. In an automatic gear shifting mechanism, the combination with a longitudinally shiftable shaft, of a selective device carried thereby, means for moving the shaft to different positions to determine different gear combinations, gear shifting devices with which said selective device is adapted to coöperate, or to lock, according to the position thereof, rockable means carried by said shaft, and a clutch pedal adapted to coöperate with said rockable means when the shaft is in any one of its different positions.

4. In an automatic gear shifting mechanism, the combination with a longitudinally shiftable shaft, of a selective plate carried thereby, means for moving the shaft to different positions to determine different gear combinations, movable frames having operative connections for the purpose of shifting the gears, and means carried by the selective plate and the respective frames adapted for coöperation, or for relative freedom, according to the selected position of said plate, whereby one or the other of said frames may be shifted, or both of them may be blocked, and clutch operating means adapted for turning said shaft and plate when in any of their positions.

5. In an automatic gear shifting mechanism, the combination with a longitudinally shiftable shaft, of a selective plate carried thereby, means for moving the shaft to different positions to determine different gear combinations, movable frames having operative connections for the purpose of shifting the gears, and means carried by the selective plate and the respective frames adapted for coöperation, or for relative freedom, according to the selected position of said plate, whereby one or the other of said frames may be shifted, or both of them may be blocked, a movable combined locking device and safety stop adapted to coöperate with the aforesaid frames to either lock them on proper shifting of the gears, or, to interfere with them on improper shifting, and a clutch operating device controlling the action of said combined locking device and safety stop, said clutch operating device being adapted to coöperate with the longitudinally shiftable shaft to positively shift the gears.

In testimony whereof, I hereunto affix my signature.

FREDERICK E. RENICK.